United States Patent
Drott et al.

[11] Patent Number: 6,053,090
[45] Date of Patent: Apr. 25, 2000

[54] VACUUM BRAKE POWER BOOSTER

[75] Inventors: Peter Drott; Frank Stöhr, both of Frankfurt am Main; Horst Krämer, Offenbach, all of Germany

[73] Assignee: ITT Manufacturing Enterprises Inc., Wilmington, Del.

[21] Appl. No.: 08/952,571

[22] PCT Filed: May 30, 1996

[86] PCT No.: PCT/EP96/02322

§ 371 Date: Feb. 2, 1998

§ 102(e) Date: Feb. 2, 1998

[87] PCT Pub. No.: WO96/38329

PCT Pub. Date: Dec. 5, 1996

[30] Foreign Application Priority Data

May 30, 1995 [DE] Germany ............... 195 19 699

[51] Int. Cl.[7] .................................... F15B 13/16
[52] U.S. Cl. ............................... 91/367; 91/376 R
[58] Field of Search ................... 91/367, 376 R

[56] References Cited

U.S. PATENT DOCUMENTS 5,040,450  8/1991  Jakobi ........................ 91/376 R
5,460,074  10/1995  Balz et al. ................. 91/376 R

FOREIGN PATENT DOCUMENTS

94/11226  5/1994  WIPO .

*Primary Examiner*—F. Daniel Lopez
*Attorney, Agent, or Firm*—Rader, Fishman & Grauer PLLC

[57] ABSTRACT

A vacuum brake power booster for automotive vehicles has a booster housing with a movable wall and a control housing which carries the movable wall. The control housing includes a main part which is accommodated in a guide tube along with a cover part axially slipped onto the main part. A solenoid for actuating a control valve is positioned in the control housing, and one axial side of the solenoid is mounted in the main part and the other axial side thereof is mounted in the cover part. The cover part has axially projecting centering segments which elastically deform and center the main part in a clearance-free manner during the assembly of the control housing.

10 Claims, 3 Drawing Sheets

VACUUM BRAKE POWER BOOSTER

BACKGROUND OF THE INVENTION

The present invention relates to a vacuum brake power booster for automotive vehicles, including a booster housing having its interior subdivided by a movable wall into a vacuum chamber and a working chamber; a control housing which carries the movable wall and accommodates a control valve that is operable by an actuating rod and controls a pressure difference acting upon the movable wall; and a solenoid which acts upon the control valve and permits ventilating the working chamber irrespective of the actuating rod.

German patent application No. 43 24 688 discloses a vacuum brake power booster of this type.

An object of the present invention is to improve a vacuum brake power booster, more particularly, with respect to a simple design and low-cost manufacture.

SUMMARY OF THE INVENTION

This object is achieved by a control housing with a main part which is arranged and connected in a guide tube along with a cover part slipped axially onto the main part, wherein the solenoid is mounted in the main part on one axial side and in the cover part on the other axial side, and wherein the cover part includes axially protruding centering segments which elastically deform the main part and center it in a clearance-free manner during the assembly of the control housing. In such two-part control housings, tolerances may cause an eccentric positioning of the points of support with respect to the axis of symmetry of the vacuum brake power booster. Thus, an inclined positioning of the solenoid may occur. This may cause leakage of the control valve and increased wear on the points of support. To ensure improved centering under all tolerance conditions occurring, according to the present invention, the cover part includes axially protruding centering segments which elastically deform the control housing and provide its clearance-free centering during the assembly. This takes place automatically without further action of the fitter so that additional manufacturing costs are avoided. The centering segments themselves are shaped during the manufacture of the cover part also without involving additional costs. In a preferred aspect of the present invention, four centering segments are provided which make catch at the main part from radially inwardly and expand the main part during the assembly.

Because a support of the cover part in relation to the solenoid which is positioned in a circumferential direction is important during operation as well, in another preferred aspect of the present invention, additional axial projections with slip chamfers on the cover part are provided to interact with a radial projection on the main part and determine the mutual angular position in the assembly of the cover part and the main part.

In a preferred aspect of the present invention, the cover part includes in its radially outward fringe area a recess for electric cables to pass through. The recess is laterally defined by two radially projecting arms. The cover part of the present invention can still be improved by spacers which extend from the arms and project axially outwardly until the area of a spring of the system. This prevents the electric cables which extend from the solenoid outwardly from getting jammed between the guide tube of the control housing and the spring or its spring guide plate during operation. A sufficient passage is maintained for the cables even under most unfavorable conditions, such as expanding of the spring, transverse forces generated by deformation of the spring, or in the event of eccentricities.

According to another preferred aspect of the present invention, a cable support for fixing the cables is arranged in the control housing in the radial area between the cover part and the guide tube where the cable passes through the cover part. The cables are guided in a defined position, and wear of the cables due to rubbing on parts of the housing, for example, the spring of the system, is prevented by such an arrangement. Further, relief from tension of the cables at the connecting points to the solenoid, or the accommodation of bending and torsional moments for relief of a cable tree of the solenoid or a release switch can be achieved by a corresponding design of the cable support.

The cable support of the present invention can be made of sheet metal or plastic material in one piece or preferably in two pieces. In the two-part design, the cables can be squeezed between the two parts. In an embodiment made of plastic material, the cables may also be spray-coated by plastic material. The mentioned embodiments are especially favorable to achieve a simple assembly and low manufacturing costs.

In a preferred aspect of the present invention, a second cable support is located outside the control housing on the end of a cable tree. This way, the cables are relieved from tension with respect to the cable tree.

Embodiments of the present invention will be described in detail hereinbelow, making reference to the accompanying drawings.

DETAILED DESCRIPTION OF THE DRAWINGS

Figure 1:
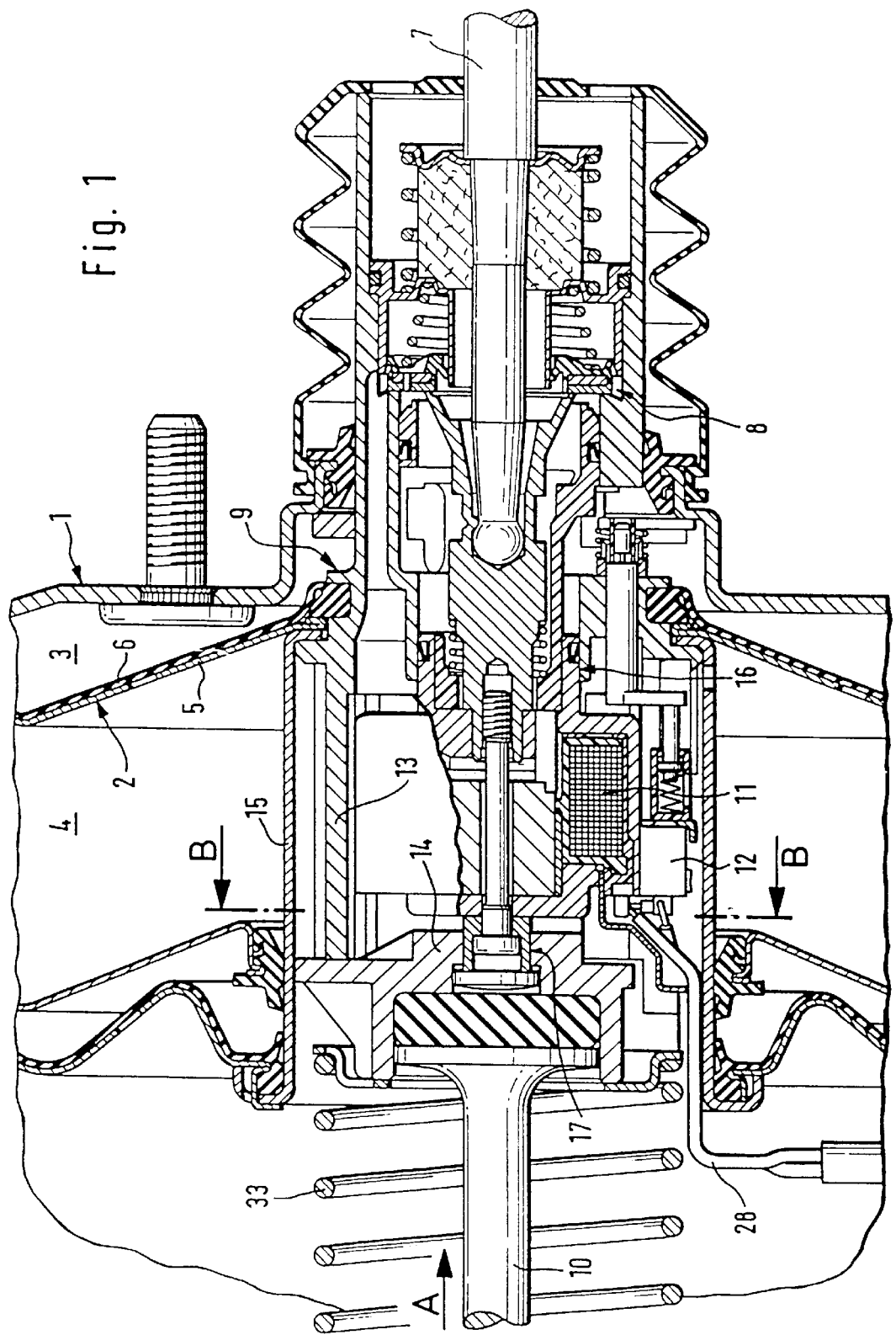
FIG. 1 is a cross-sectional partial view of a vacuum brake power booster of the present invention.
Figure 2:
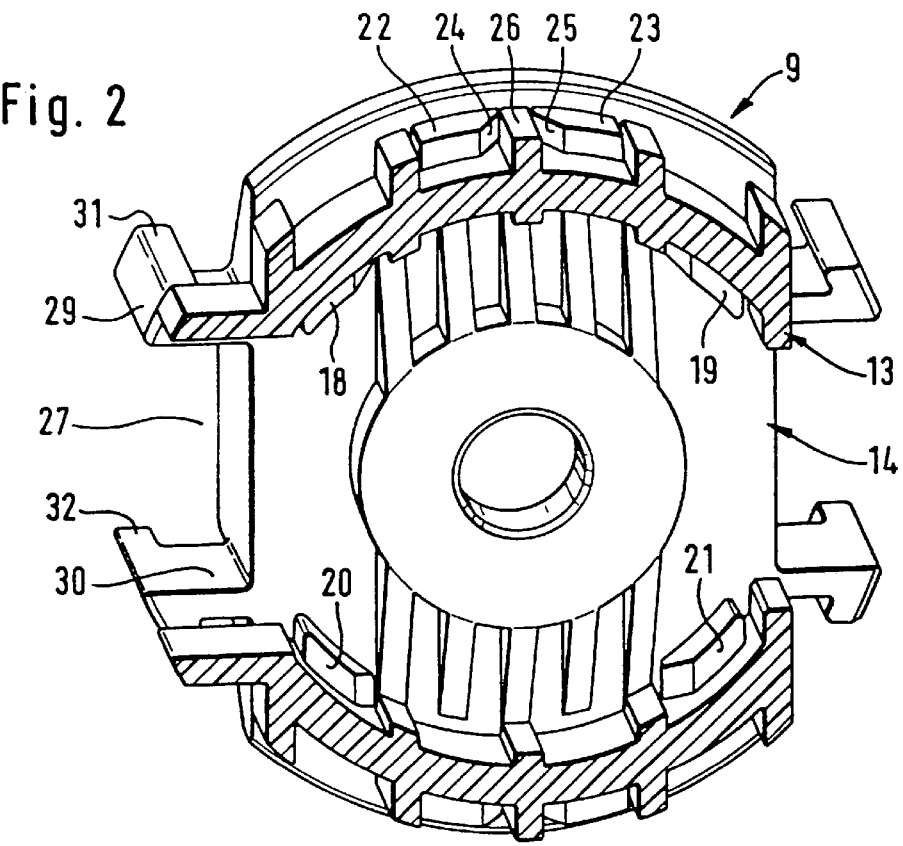
FIG. 2 is a cross-sectional partial view, along line B—B in FIG. 1, of the control housing including the cover part.
Figure 3:
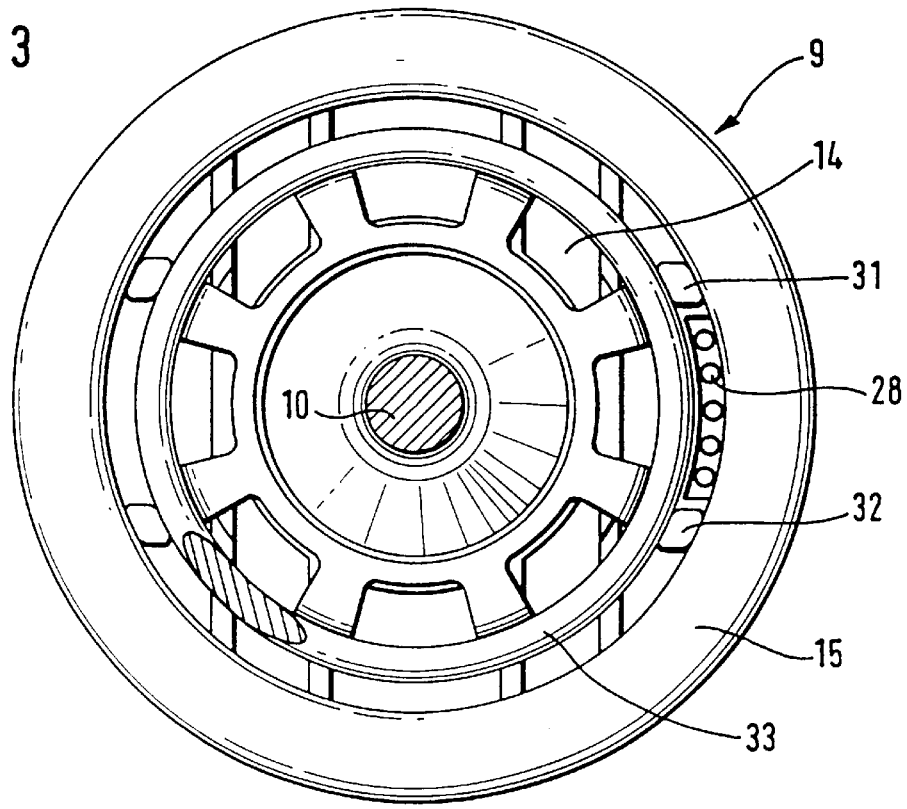
FIG. 3 is a view of the control housing including the cover part from the direction A of FIG. 1.

The booster housing 1 of the illustrated vacuum brake power booster of the present invention as subdivided by an axially movable wall 2 into a working chamber 3 and a vacuum chamber 4. The axially movable wall has a diaphragm plate 5, deep-drawn from sheet metal, and a flexible diaphragm 6 abutting thereon. Diaphragm 6 (not shown in detail), configured as a rolling diaphragm, provides a seal between the external periphery of the diaphragm plate 5 and the booster housing 1.

A control valve 8 accommodated in a control housing 9 is operated by an actuating rod 7. The control housing 9 is axially slidable and sealed in the booster housing 1. The movable wall 2 is fastened to the control housing 9. The brake force is transmitted to a push rod 10 by way of the control housing 9. Push rod 10 actuates the actuating piston of a master cylinder (not shown) of a brake system.

A solenoid 11 adapted to operate the control valve 8 is used to initiate an independent activation of the vacuum brake power booster of the present invention irrespective of the actuating rod 7. Upon operation of the control valve 8 by the solenoid 11, the working chamber 3 is acted upon by atmospheric pressure so that the wall 2 is urged in the direction of the vacuum chamber 4 and the actuating force, acting upon the master cylinder by way of the push rod 10, is boosted until the maximum possible value to the effect of an emergency stop. To terminate the emergency stop, a release switch 12 is used to effect release of the solenoid 11 as soon as the actuating force applied to the actuating rod 7 is removed.

The control housing 9 is comprised of a main part 13 and a cover part 14 which are accommodated and connected in a guide tube 15. The cover part 14 is slipped onto the main part 13 in an axial direction. The solenoid 11 is supported in the main part 13 on one axial side 16 and in the cover part 14 on the other axial side 17. The cover part 14 includes axially projecting centering segments 18, 19, 20, 21 which elastically deform and thereby center the main part 13 in a clearance-free manner during the assembly of the control housing 9. In this arrangement, the main part 13 is slightly expanded in its fringe area by the four centering segments 18, 19, 20, 21 which are positioned roughly uniformly in a circumferential direction. This is due to the centering segments 18, 19, 20, 21 being conformed to the inside diameter of the main part 13 so that they press from radially inwardly to the outside.

Further, the cover part 14 has two additional axial projections 22, 23, each having a slip chamfer 24, 25. When the control housing 9 is assembled, the cover part 14 is slipped axially onto the main part 13, and a radial projection 26 of the main part 13 cooperates with the slip chamfers 24, 25 of the projections 22, 23 and rotates the two parts 13, 14 with respect to each other until they have adopted their mutual angular position defined by the projections 22, 23, 26.

The cover part has a recess 27 in its radially outward fringe area. Recess 27 is used for the passage of electric cables 28 which extend from the solenoid 11 out of the control housing 9 in a paraxial direction. The cover part 13 includes two arms 29, 30 which laterally define the recess 27 and project radially until the guide tube 15. Integrally designed spacers 31, 32 extend from the arms 29, 30 and project axially outwardly until the area of a system spring 33.

Figure 4:
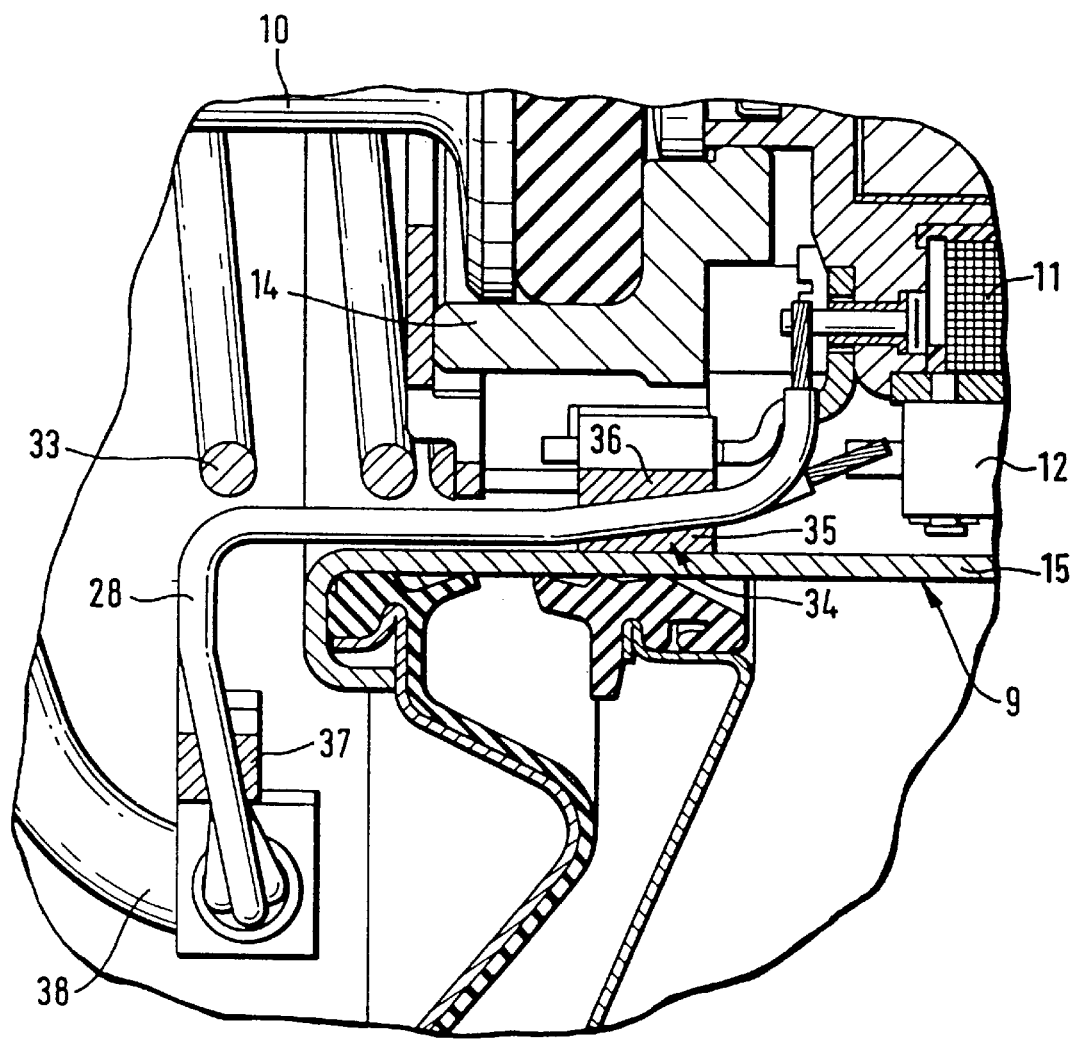
FIG. 4 is a cross-sectional partial view, similar to FIG. 1, of another embodiment of the present invention.

In the embodiment shown in FIG. 4, a cable support 34 for fixing the cables 28 is positioned radially between the cover part 14 and the guide tube 15 and axially in the area of the cover part 14. The cable support 34 is made of plastic material and composed of two parts 35, 36 in-between which the cables 28 are squeezed. A second cable support 37 is arranged outside the control housing 9 at the end of a cable tree 38.

In an embodiment not shown, a cable support is provided by the cables 28 being injection-molded with plastic material.

We claim:

1. A vacuum brake power booster for automotive vehicles, including a booster housing having its interior subdivided by a movable wall into a vacuum chamber and a working chamber; a control housing which carries the movable wall and accommodates a control valve that is operable by an actuating rod and controls a pressure difference acting upon the movable wall; and a solenoid which acts upon the control valve and permits ventilating the working chamber independent of the actuating rod, wherein the control housing has a main part which is arranged and connected in a guide tube along with a cover part slipped axially onto the main part, wherein the solenoid is mounted in the main part on one axial side and in the cover part on the other axial side, and wherein the cover part includes axially protruding centering segments which elastically deform the main part and center it in a clearance-free manner during the assembly of the control housing.

2. The vacuum brake power booster as claimed in claim 1, wherein four centering segments are provided which presses at the main part from radially inwardly and expands the main part during the assembly.

3. The vacuum brake power booster as claimed in claim 1, wherein the cover part has two additional projections with slip chamfers which interact with a radial projection on the main part and determine the mutual angular position in the assembly of the cover part and the main part.

4. The vacuum brake power booster as claimed in claim 1, wherein the cover part includes in its radially outward fringe area a recess for electric cables to pass through, the recess being laterally defined by two radially projecting arms, and wherein spacers extend from the arms and project axially outwardly until the area of a system spring.

5. The vacuum brake power booster as claimed in claim 1, wherein the electric cables which extend to the solenoid lead in a paraxial direction into the control housing and radially between the cover part and the guide tube, and wherein a cable support for fixing the cables is arranged at least axially in the area of the cover part.

6. The vacuum brake power booster as claimed in claim 5, wherein the cable support is made of sheet metal.

7. The vacuum brake power booster as claimed in claim 5, wherein a second cable holder is located outside the control housing on the end of a cable tree.

8. The vacuum brake power booster as claimed in claim 5, wherein the cable support is made of plastic material.

9. The vacuum brake power booster as claimed in claim 8, wherein the cable support has a two-part design, and wherein the cables are squeezed between the two parts.

10. The vacuum brake power booster as claimed in claim 8, wherein the cables are spray-coated by plastic material.

* * * * *